US009236775B2

(12) United States Patent
Takahashi et al.

(10) Patent No.: US 9,236,775 B2
(45) Date of Patent: Jan. 12, 2016

(54) ROTARY ELECTRIC MACHINE

(71) Applicant: DENSO CORPORATION, Kariya, Aichi-pref. (JP)

(72) Inventors: Yuki Takahashi, Obu (JP); Masahiro Seguchi, Obu (JP)

(73) Assignee: DENSO CORPORATION, Kariya (JP)

(*) Notice: Subject to any disclaimer, the term of this patent is extended or adjusted under 35 U.S.C. 154(b) by 223 days.

(21) Appl. No.: 13/861,836

(22) Filed: Apr. 12, 2013

(65) Prior Publication Data
US 2013/0270958 A1    Oct. 17, 2013

(30) Foreign Application Priority Data

Apr. 12, 2012   (JP) .................................. 2012-091241

(51) Int. Cl.
*H02K 21/12*    (2006.01)
*H02K 1/27*    (2006.01)
(Continued)

(52) U.S. Cl.
CPC ................ *H02K 1/274* (2013.01); *H02K 1/276* (2013.01); *H02K 1/2766* (2013.01); *H02K 21/14* (2013.01); *H02K 29/03* (2013.01); *H02K 2201/06* (2013.01); *H02K 2213/03* (2013.01)

(58) Field of Classification Search
CPC ....... H02K 1/12; H02K 1/276; H02K 1/2766; H02K 3/04; H02K 3/12; H02K 17/30; H02K 1/27; H02K 1/2726; H02K 21/14; H02K 29/03; H02K 2213/00; H02K 2213/03; H02K 2201/06; H02K 21/00; H02K 21/12; H02K 1/45; H02K 21/16; H02K 21/125
USPC ........ 310/41, 42, 43, 46, 49.03, 49.04, 49.32, 310/49.35, 49.41, 152, 156.01, 156.05, 310/156.07, 156.19, 156.25, 156.31, 310/156.36, 156.37, 156.43, 156.47, 310/156.68, 156.72, 156.82, 216.017, 310/216.011, 216.012, 216.013
See application file for complete search history.

(56) References Cited

U.S. PATENT DOCUMENTS 2,408,219  A  *  9/1946   Liwschitz ...................... 310/202
4,700,097  A  *  10/1987  Kawada et al. ................ 310/162
(Continued)

FOREIGN PATENT DOCUMENTS

JP    2000-134891    5/2000
JP    3370901       11/2002
(Continued)

OTHER PUBLICATIONS

Machine translation for JP 2008-131693 Sep. 12, 2015.*
(Continued)

*Primary Examiner* — Hanh Nguyen
(74) *Attorney, Agent, or Firm* — Nixon & Vanderhye P.C.

(57) ABSTRACT

A rotary electric machine includes a stator and a rotor located in a rotatable manner relative to the stator via a gap. The stator includes a multi-phase stator winding that is held in a plurality of slots formed in the stator. The rotor includes at least one magnet section embedded therein so as to face the slots. The magnet section includes a plurality of axially laminated magnets with a skew angle which is an angle of a positional difference between the magnets. This skew angle $\theta s$ is set so as to satisfy $\theta s = k\alpha/2$ where $\alpha$ is a slot pitch which is an angle between the slots, and k is a coefficient set based on: an arc ratio $\theta a$ being an angle covering an area in which magnetic flux radially flows from the magnetic section; and a slot factor S being a ratio of the slots relative to the magnet section.

16 Claims, 14 Drawing Sheets

(51) Int. Cl.
*H02K 21/14* (2006.01)
*H02K 29/03* (2006.01)

(56) References Cited

U.S. PATENT DOCUMENTS

| | | | |
|---|---|---|---|
| 5,627,419 A * | 5/1997 | Miller | 310/74 |
| 6,133,662 A | 10/2000 | Matsunobu et al. | |
| 6,211,593 B1 | 4/2001 | Nashiki | |
| 7,057,322 B2 * | 6/2006 | Araki et al. | 310/156.53 |
| 8,766,503 B2 * | 7/2014 | Kagami et al. | 310/156.53 |
| 2001/0043020 A1 * | 11/2001 | Nishiyama et al. | 310/156.01 |
| 2004/0164635 A1 * | 8/2004 | Takahashi et al. | 310/156.47 |
| 2004/0245880 A1 * | 12/2004 | Liang | 310/156.47 |
| 2005/0179334 A1 * | 8/2005 | Yoshinaga | 310/156.47 |
| 2005/0200223 A1 * | 9/2005 | Tajima et al. | 310/156.46 |
| 2006/0113858 A1 | 6/2006 | Hino et al. | |
| 2011/0309706 A1 | 12/2011 | Takahashi et al. | |

FOREIGN PATENT DOCUMENTS

| | | |
|---|---|---|
| JP | 2008-131693 | 6/2008 |
| JP | 2010-148235 | 7/2010 |
| JP | 4668721 | 1/2011 |

OTHER PUBLICATIONS

Office Action (3 pages) dated Mar. 24, 2015, issued in corresponding Japanese Application No. 2012-091241 and English translation (4 pages).

* cited by examiner

11-TH ORDER

13-TH ORDER

ROTARY ELECTRIC MACHINE

CROSS-REFERENCE TO RELATED APPLICATION

This application is based on and claims the benefit of priority from earlier Japanese Patent Application No. 2012-091241 filed Apr. 12, 2012, the description of which is incorporated herein by reference.

BACKGROUND

1. Technical Field

The present invention relates to a rotary electric machine having a stator and a rotor.

2. Related Art

In related art, there is disclosed a technique for a permanent magnet rotary electric machine, in order to reduce a peak value of an induced voltage generated when a vehicle is braked or traveling downhill (see, for example, JP-B2-3370901). This permanent magnet rotary electric machine has a stator and a rotor with a plurality of permanent magnets. In the stator, a plurality of slots are formed. In these slots, three-phase stator windings, i.e., U-phase, V-phase and W phase windings are held. This rotary electric machine is configured so as to satisfy $\theta \approx (n+0.5) \times \tau s$ where n is a natural number, $\tau s$ a slot pitch of the stator, and $\theta$ is an angle of a circumferential width of a stator side face of the respective permanent magnets relative to an axis of the rotor.

However, when the permanent magnet rotary electric machine disclosed in JP-B2-3370901 increases the number of slots, its back electromotive force (B-EMF) is likely to have a waveform with large harmonic distortion. For example, such a waveform is largely affected by an (Sn/Po)±first order harmonic component, where Sn is the number of slots and Po is the number of pole pairs. Thus, an additional circuit element such as a capacitor having capacitance capable of cancelling increase of the B-EMF is required to keep impact of the harmonic components on the waveform of the B-EMF low. This causes a large capacitance or a large body.

In addition, total harmonic distortion (THD) is expressed by the following formula (1):

$$THD = \frac{\sqrt{V_2^2 + V_3^2 + V_4^2 + \ldots + V_n^2}}{V_1} \quad (1)$$

where $V_1$ is an amplitude of a fundamental wave (sinusoidal wave), and $V_2, V_3, \ldots, V_n$ are harmonic components having frequencies equal to integral multiples of frequency of the fundamental wave (n is an integer and the highest order of the harmonic components).

The THD in the formula (1) shows that the waveform is how much distortion exists with respect to the fundamental wave. The stronger the harmonic components, the higher the THD. For example, FIG. 26 is a graph representing an amplitude variation of 5-th, 7-th, 11-th, and 13-th harmonic components relative to the fundamental wave waveform with respect to an arc ratio θa, which is an angle indicating a range in which magnetic flux radially flows from the magnet section in related art. As shown in FIG. 26, the 11-th harmonic component relative to the fundamental wave represents the maximum value at each point, and therefore, the THD is high. Further, a problem occurs in that, the more intense harmonic components are, the stronger the noise vibration (NZ) is.

SUMMARY

The present disclosure provides a rotary electric machine, which is able to keep harmonic components low and to reduce noise vibration, without the need for an additional circuit element such as a capacitor.

According to one aspect of the present disclosure, there is provided a rotary electric machine, including: a stator including a multi-phase stator winding that is held in a plurality of slots formed in the stator; and a rotor located in a rotatable manner relative to the stator via a gap, the rotor including at least one magnet section embedded therein so as to face the slots. The magnet section includes a plurality of axially laminated magnets with a skew angle which is an angle of a positional difference between the magnets. The skew angle being set so as to satisfy:

$$\theta s = k\alpha/2$$

where θs (deg) is the skew angle, α (deg) is a slot pitch which is an angle between the slots, and k is a coefficient which is set based on (i) an arc ratio represented by θa (deg) which is an angle covering an area in which magnetic flux radially flows from the magnetic section and (ii) a slot factor represented by S which is a ratio of the slots relative to the magnet section and expressed by:

$$S = Sn/(Mn \times Ph)$$

where Sn is the number of the slots, Mn is the number of magnetic poles in the rotor, and Ph is the number of phases of the rotary electric machine.

According to this configuration, it is experimentally ascertained that, when the skew angle is set so as to satisfy θs=kα/2, harmonic components (particularly, 5-th or more order harmonic components) can be kept low. This allows THD in the formula (1) to be low, and then, noise vibration can be reduced compared to related art. Due to the low THD, circuit elements such as IGBTs (insulated gate bipolar transistors) and FETs (field effect transistors) used in inverters, motor drivers, or the like can be configured by those that have low pressure resistance and are available at relatively low cost. Thus, cost reduction can be achieved.

The rotary electric machine may be configured by a machine having a stator and a rotor, for example, a generator, an electric motor, a motor-generator, or the like. The number of "multi-phase" may be arbitrary, but three-phase, four-phase, six-phase, or the like may be mainly applied. In the "magnet section" that is also called a "stepped skew", the plurality of magnets are axially laminated. Among the plurality of magnets, one or more magnets are skewed in such a manner that a boundary of magnetic poles is circumferentially shifted. The "slot factor" shows a ratio of the slots relative to the magnet section and is expressed by S=Sn/(Mn× Ph) where S is the slot factor, Sn is the number of the slots, Mn is the number of magnetic poles, and Ph is the number of phases.

In the magnet section, the skew angle θs may be set so as to satisfy θs=kα/2 where k=S, when the arc ratio θa lies in a range of 2.2Sα≤θa≤2.4Sα. In this case, the skew angle θs is set so as to satisfy θs=Sα/2. According to this configuration, it is experimentally ascertained that, when the skew angle is set so as to satisfy θs=Sα/2 at 2.2Sα≤θa≤2.4Sα, there is relatively small influence from 11-th, 13-th, or the like order harmonic components, and 5-th, 7-th, or the like order harmonic components can be effectively cancelled. Thus, THD can be kept low, and noise vibration can be reduced compared to related art. These effects can be obtained without the need for an additional circuit element such as a capacitor, and then, cost reduction can be achieved.

In the magnet section, the skew angle θs may be set so as to satisfy θs=kα/2 where k=1, when the arc ratio θa lies in a range of 2.2α≤θa≤3.2α. In this case, the skew angle θs is set so as to satisfy θs=α/2. According to this configuration, it is ascertained that, when the skew angle is set so as to satisfy θs=α/2 at 2.2α≤θa≤3.2α, there is relatively small influence from 5-th, 7-th, or the like order harmonic components, and 11-th, 13-th, or the like order harmonic components can be effectively cancelled. Thus, THD can be kept low, and noise vibration can be reduced compared to related art. These effects can be obtained without the need for an additional circuit element such as a capacitor, and then, cost reduction can be achieved.

DESCRIPTION OF EMBODIMENTS

Figure 1:
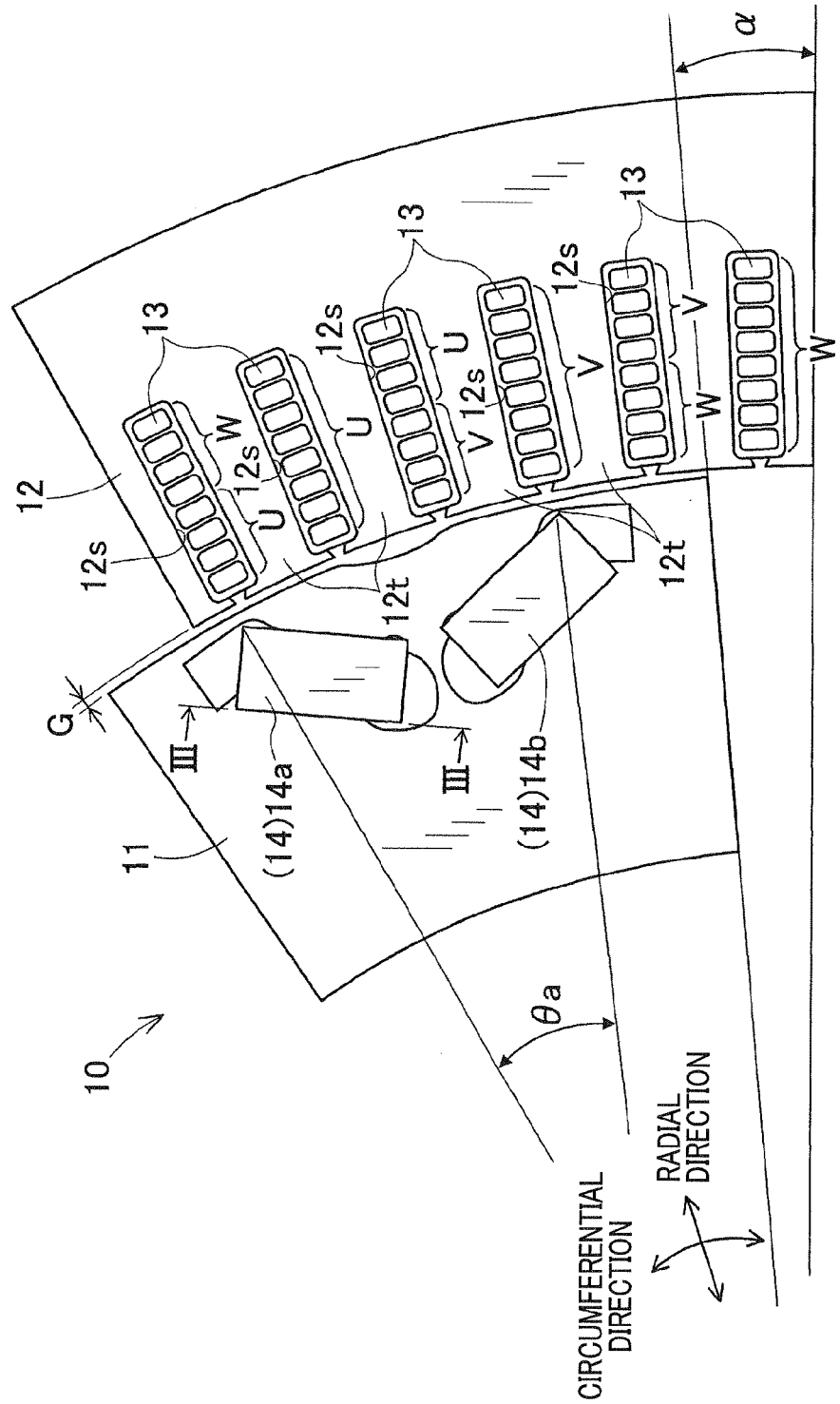
FIG. 1 is a partially schematic diagram showing a configuration of a rotary electric machine with a stator and a rotor according to an exemplary embodiment of the present invention.

Hereinafter, a rotary electric machine according to exemplary embodiments of the present disclosure will be described with reference to the drawings. In the description, unless otherwise specified, the term "connect" means "electrically connect". In the drawings, the elements necessary for explanation of the exemplary embodiments are shown. In other words, all of the elements are not necessarily shown in the drawings. In the description, vertical and horizontal (upper-lower and right-left) directions or the like are based on the contents of the drawings. The rotary electric machine according to exemplary embodiments may be applied to a generator, an electric motor, or a motor generator which is used for vehicles.

First Exemplary Embodiment

A first exemplary embodiment is described with reference to FIGS. 1 to 18. FIG. 1 shows a part of an overall configuration of a rotary electric machine 10 having a rotor 11 and a stator 12. FIG. 1 is a cross-section diagram, but the hatching is omitted therefrom to make the description easier to understand. In the rotary electric machine 10, the number of phases, the number of pole pairs (i.e., a pair of north and south poles), and the number of slots can be arbitrarily set. In the present embodiment, the rotary electric machine 10 is configured by an inner rotor type in which a rotor 11 is located at the inner diameter side from the stator 12. In this type, the number of phases is three (i.e., U-phase, V-phase and W-phase), the number of pole pairs is 12, and the number of slots is 72.

The rotor 11 is located in a rotatable manner relative to the stator 12 via a gap G. This rotor 11 is provided with a plurality of magnet sections 14 (for example, 12 magnet sections in this embodiment) which is embedded in an iron core (i.e., rotor core). Each of the magnet sections 14 is made of one or more magnet portions. The number of magnet portions can be arbitrarily set. In this embodiment, as shown in FIG. 1, each of the magnet sections 14 has two magnet portions (sub-sections) 14a and 14b. Here, an angle indicating a range in which the magnetic flux radially flow from the magnet portions 14a and 14b is referred to as "arc ratio θa (deg)". In other words, this arc ratio θa corresponds to an angle of a circumferential width of a face on the side of the rotor 11 relative to a shaft center P (see FIG. 2) of the rotor 11. The shaft center P means a central axis of a rotating body (i.e., the rotor 11 in this embodiment). The same applies hereinafter. The configuration of the respective magnet portions 14a and 14b is described below (see FIG. 3).

In the stator 12, a plurality of slots 12s (for example, 72 slots in this embodiment) are formed, and a stator winding 13 is held and wound in the respective slots 12s. Each of the slots 12s is located so as to face each pole of the magnet sections 14 (the magnet portions 14a and 14b). In other words, each of the slots 12s is formed into an elongated hole shape which is elongated along a direction (i.e., radial direction) opposite to the outer periphery of the rotor 11. Here, an angle between each circumferentially adjacent two slots 12s relative to the shaft center P (see FIG. 2) is referred to as "slot pitch". A plurality of teeth 12t are formed between each circumferentially adjacent two slots 12s. The inner periphery of the respective teeth 12t is placed so as to face the outer periphery of the rotor 11 via the gap G. Magnetic flux flows between the teeth 12t of the stator 12 and the outer periphery of the rotor 11 via the gap G. A relationship between the slots 12s and the magnet sections 14 (magnetic poles) is described below (see FIG. 2).

In the stator winding 13, the number of phases and the winding method can be arbitrary, and be properly set depending on, for example, the purpose of use of the rotary electric machine 10 and necessary torques. In this embodiment, the number of phases is three (i.e., three-phase windings), and the winding method is a short pitch winding. By means of the short pitch winding, three-phase windings forming the stator winding 13 are wound in such a way as to cross a predetermined number of the slots 12s. The predetermined number of the slots 12s can be arbitrary. In this embodiment, three-phase windings are wound so as to cross three slots 12s by a ratio of 1:2:1. In FIG. 1, the "U", "V", and "W" shown in the stator winding 13 mean the U-phase winding, V-phase winding, and W-phase winding which are wound in the slots 12s.

Figure 2:
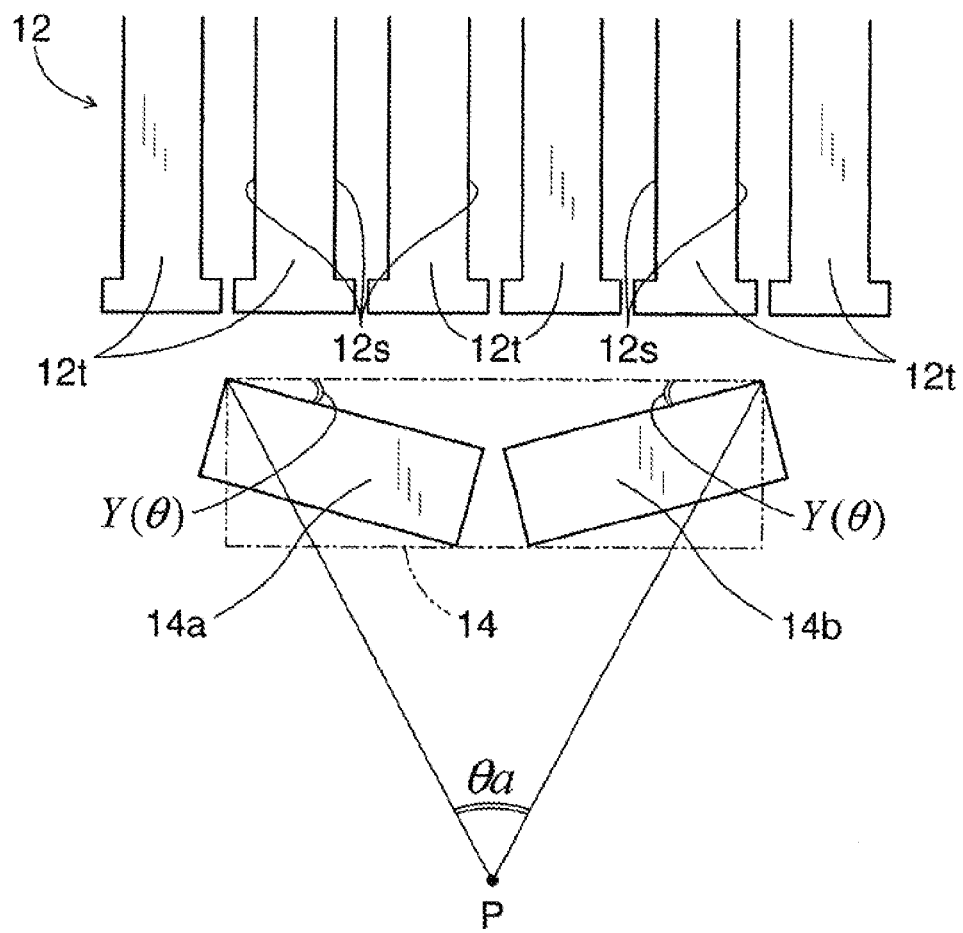
FIG. 2 is a first schematic diagram explaining slot factor in the rotary electric machine shown in FIG. 1.

In FIG. 2, the magnet portions 14a and 14b are located in such a way as to be inclined at an angle (hereinafter referred to as "inclination angle") $Y(\theta)$ to be mirror images of each other. This inclination angle $Y(\theta)$ may be arbitrarily set within a range of $0(\deg) \leq Y(\theta) \leq 180(\deg)$. The arc ratio $\theta a$ is expressed by a relative angle between two line segments: one that connects a circumferential end point of the respective magnet portion 14a and the shaft center P; and the other that connects a circumferential end point of the respective magnet portion 14b and the shaft center P. If the total magnetic flux of the two magnet portions 14a, 14b and the magnetic flux of the magnetic section 14 are the same, the magnet portions 14a, 14b may be configured by one magnet section 14 (i.e., magnetic pole). The same can be applied to the case in which three or more magnet portions configures one magnet section 14. The same magnetic flux allows the number of the magnet portions and the inclination angle to be arbitrary, which is described in detail below (see FIGS. 15 to 18). In FIG. 2, the rotor 11 and the stator winding 12 are not shown.

In the present embodiment, the number of the slots 12s is set to 72, the number of phases of the stator winding 13 is set to 3, and the number of the magnetic sections 14 is set to 12.

Here, a "slot factor" is defined by a ratio of the slots relative to the magnets (magnetic poles) and is given by:

$$S = Sn/(Mn \times Ph)$$

where S is the slot factor, Sn is the number of slots, Mn is the number of magnetic poles, and Ph is the number of phases.

For example, the slot factor of the rotary electric machine 10 as described above is a value of 2 (=72/(3×12)). In other words, the number of slots 12s per one magnetic section 14 is a value of 6 derived by multiplying the number of phases (i.e., a value of 3) and the slot factor (i.e., a value of 2) together. That is, as shown in FIG. 2, 6 slots 12s per one magnetic section 14 correspond to a magnetic flux flow.

Figure 3:
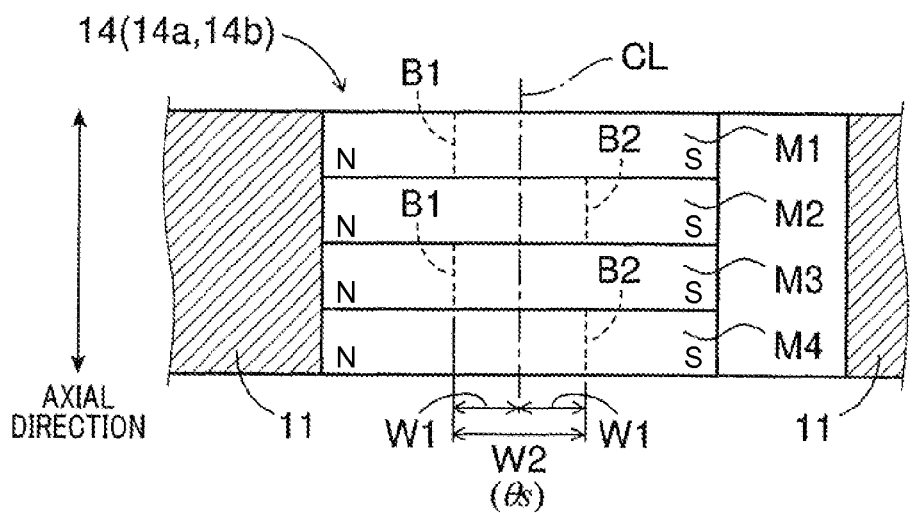
FIG. 3 is a schematic diagram showing a first configuration of a magnet section in the rotor shown in FIG. 1.

FIG. 3 is a cross-section taken from line III to III of FIG. 1. The magnetic section 14 shown in FIG. 3 is one of the plurality of magnetic sections 14 (12 magnetic sections 14) embedded in the iron core (i.e., rotor core). In FIG. 3, hatching for showing magnet is omitted in order to make a boundary between magnetic poles indicated by dashed line easy to understand. The magnet portions 14a and 14b also shown in FIG. 1 have the same configuration, and then, hereinafter, the magnet portion 14a is described on behalf of them.

The magnet portion 14a is configured by laminating a plurality of magnets (four magnets M1, M2, M3 and M4 in this embodiment) in an axial direction (corresponding to a vertical direction of FIG. 3). In FIG. 3, B1 is a boundary of magnetic poles (north and south poles) of the respective magnets M1 and M3, and B2 is a boundary between magnetic poles of the respective magnets M2 and M4. In FIG. 3, the boundary B1 is located toward the left side from a center line CL (corresponding to a center; hereinafter the same shall apply) indicated by chain line by a width W1. The boundary B2 is located toward the right side from the center line CL by a width W1. That is, the boundaries B1 and B2 are positioned symmetrically to each other with respect to the center line CL. One side of the respective boundaries B1 and B2 is magnetized to be formed into a north pole, and the other side is magnetized to be formed into a south pole. Hereinafter, the term "skew" is used to mean that the boundaries B1, B2 of the magnets are set to positions other than the center line CL.

In FIG. 3, all of the magnets M1, M2, M3 and M4 are skewed, but any one of a first pair of the magnets M1, M2 and a second pair of the magnets M3, M4 may be skewed. Here, a "skew angle" is represented by a relative angle between two line segments: one that connects the boundary B1 and the shaft center P; and the other that connects the boundary B2 and the shaft center P, which depends on a width W2 that a distance between the boundaries B1 and B2.

The rotary electric machine 10 as configured above is set in such a way as to satisfy the following formula:

$$\theta s = k\alpha/2 \qquad (2)$$

where $\theta s$ is a skew angle (deg), k is a coefficient (specifically, integer value), and $\alpha$ is a slot pitch (deg) (see FIG. 1).

If the coefficient k is set to a value of 1 (i.e., k=1), then the formula (2) is expressed by the following formula:

$$\theta s = \alpha/2 \qquad (3)$$

If the coefficient k is set to a value of the slot factor S (i.e., k=S), then the formula (2) is expressed by the following formula:

$$\theta s = S\alpha/2 \qquad (4)$$

Referring to FIGS. 4 to 11, characteristics of the rotary electric machine 10, in which the skew angle is set to satisfy the formula (2), is described.

Here, a "crest factor" is a value calculated by dividing an effective value of fundamental wave (sinusoidal wave) by actual synthetic value of back electromotive force (peak value of waveform), which is expressed by:

Crest Factor=Back Electromotive Force(Peak Value of Waveform)/Fundamental Wave(Effective Value)

As the crest factor becomes larger, the peak value of waveform becomes larger and may exceed an upper limit value of voltage for insulation. Therefore, it is preferable that the crest factor has a small value.

Figure 4:
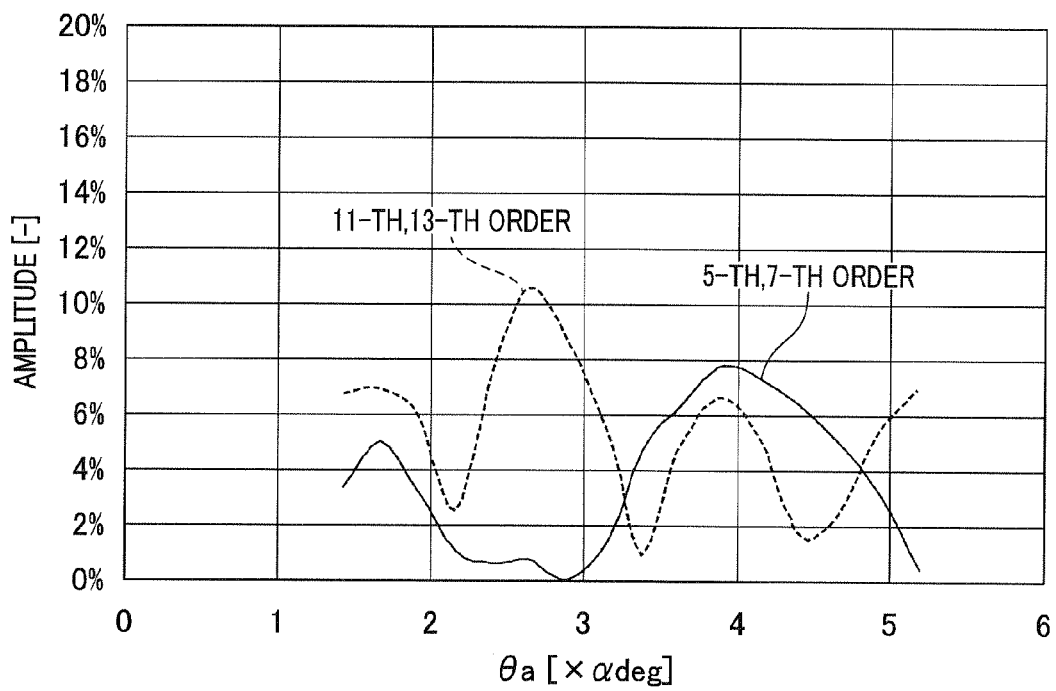
FIG. 4 is a graph showing a variation of amplitude relative to arc ratio in the rotary electric machine shown in FIG. 1.

FIG. 4 shows a variation of each order harmonic component, in which the horizontal axis represents arc ratio ($\theta a$) and the vertical axis represents amplitude of harmonic components (amplitude of harmonic component/amplitude of fundamental wave) with respect to peak value of back electromotive force (including harmonic components) relative to fundamental wave. In FIG. 4, variations of 5-th and 7-th order harmonic components are represented by solid line, and variations of 11-th and 13-th order harmonic components are represented by dashed lines.

As can be seen from the variations shown in FIG. 4, it is preferable to cancel 11-th and 13-th order harmonic components within a range of arc ratio of $\theta a < 3.25\alpha$. On the other hand, it is preferable to cancel 5-th and 7-th order harmonic components within a range of arc ratio of $\theta a < 3.25\alpha$.

Figure 5:
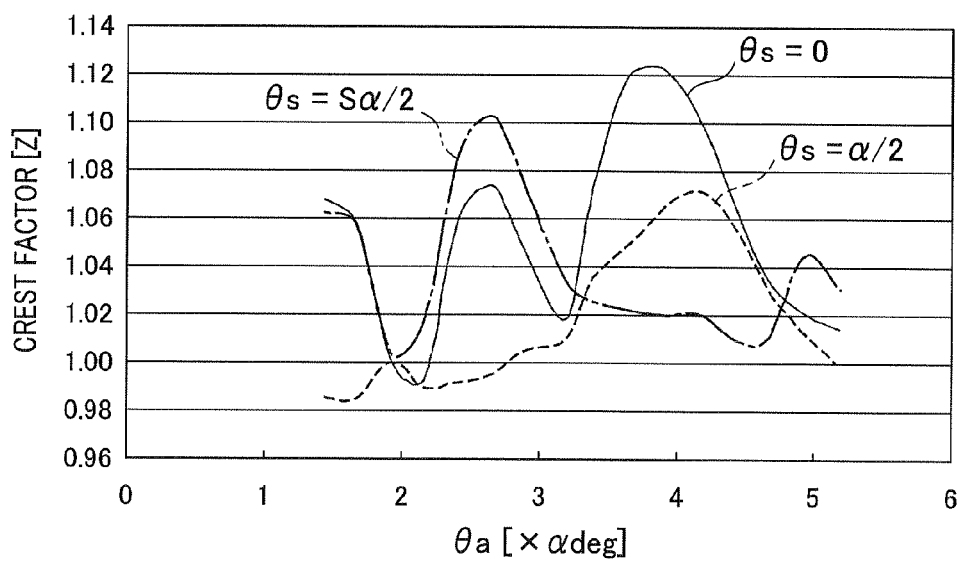
FIG. 5 is a graph showing a variation of crest factor relative to arc ratio in the rotary electric machine shown in FIG. 1.

FIG. 5 shows a variation of each skew angle, in which the horizontal axis represents arc ratio ($\theta a$) and the vertical axis represents crest factor (Z). In FIG. 5; (i) a variation in a case where the skew angle is set to zero degree (in other words, the magnets M1, M2, M3 and M4 in FIG. 3 are not skewed) is represented by solid line (i.e., $\theta s = 0$); (ii) a variation in a case where the skew angle is set to $\alpha/2$ (i.e., determined by the formula (3) as described above) is represented by a dashed line (i.e., $\theta s = \alpha/2$); and (iii) a variation in a case where the skew angle is set to $S\alpha/2$ (i.e., determined by the formula (4) as described above) is represented by a chain line (i.e., $\theta s = S\alpha/2$).

As can be seen from the variation shown in FIG. 5, in a case where the arc ratio lies in a range of values smaller than $3.25\alpha$ (i.e., $\theta a > 3.25\alpha$), when the skew angle is set to $\alpha/2$, the crest factor approaches a value of 1. Specifically, in a case where the arc ratio lies in a range from $2.2\alpha$ to $3.2\alpha$ (i.e., $\theta a = 2.2\alpha$ to $3.2\alpha$), there is only a small influence from 5-th and 7-th order harmonic components, which results in large reduction of back electromotive force.

On the other hand, in a case where the arc ratio lies in a range of values larger than $3.25\alpha$ i.e., $\theta a > 3.25\alpha$), when the skew angle is set to $S\alpha/2$, the crest factor approaches a value of 1. Specifically, in a case where the arc ratio is a value of $3.3\alpha$ and lies in a range of values of $4.4\alpha$ to $4.6\alpha$ (i.e., $\theta a = 3.3\alpha$ and $\theta a = 4.4\alpha$ to $4.6\alpha$), there is a relatively small influence from 11-th and 13-th order harmonic components, which results in large reduction of back electromotive force.

Figure 6:
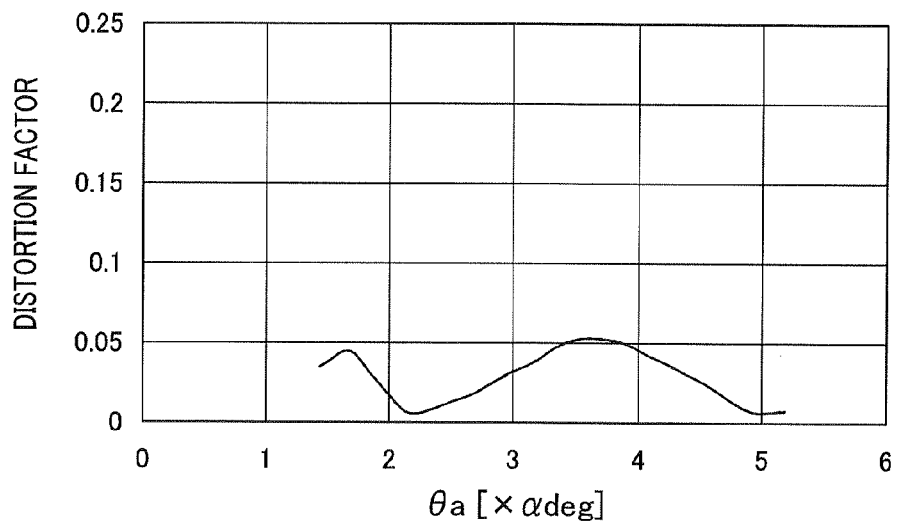
FIG. 6 is a graph showing a variation of distortion factor relative to arc ratio in 5-th harmonic component in the rotary electric machine shown in FIG. 1.
Figure 7:
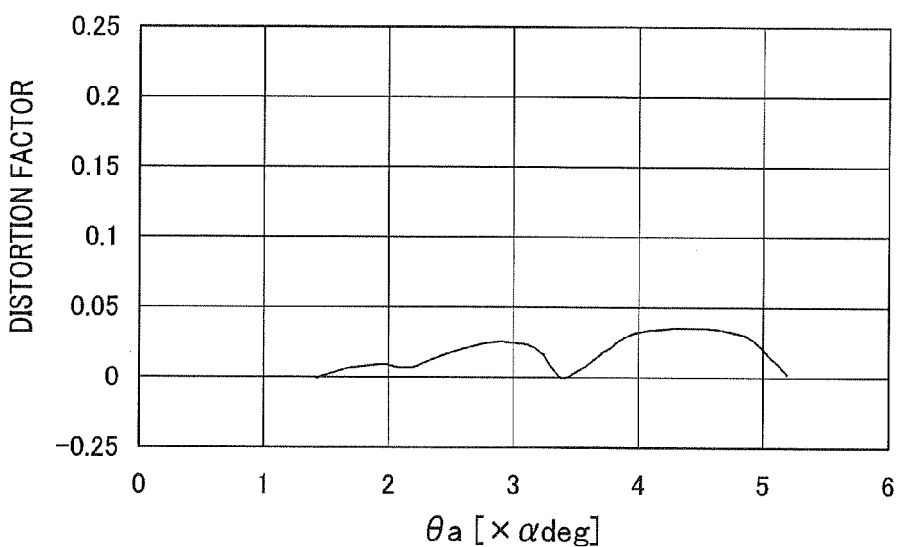
FIG. 7 is a graph showing a variation of distortion factor relative to arc ratio in 7-th harmonic component in the rotary electric machine shown in FIG. 1.
Figure 8:
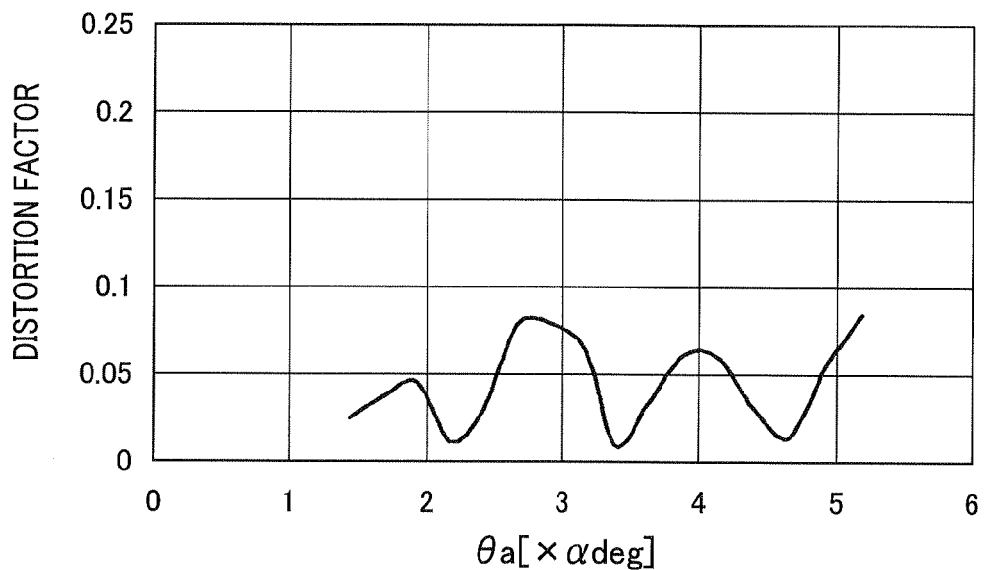
FIG. 8 is a graph showing a variation of distortion factor relative to arc ratio in 11-th harmonic component in the rotary electric machine shown in FIG. 1.
Figure 9:
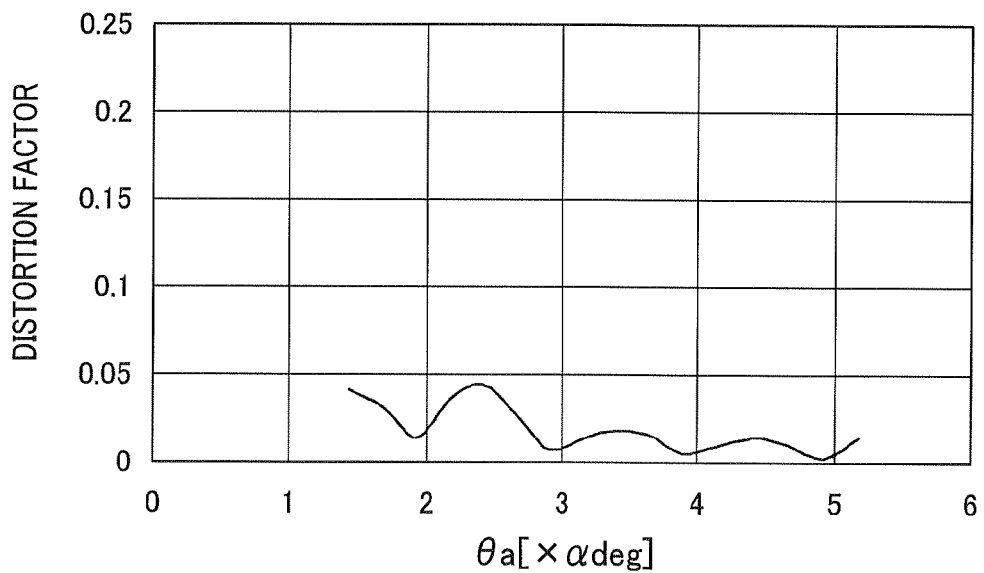
FIG. 9 is a graph showing a variation of distortion factor relative to arc ratio in 13-th harmonic component in the rotary electric machine shown in FIG. 1.

FIGS. 6 to 9 show variations of each order harmonic component, in which the horizontal axis represents arc ratio ($\theta a$) and the vertical axis represents distortion factor. FIG. 6 shows the variation of 5-th order harmonic component. FIG. 7 shows the variation of 7-th order harmonic component. FIG. 8 shows the variation of 11-th order harmonic component. FIG. 9 shows the variation of 13-th order harmonic component.

As can be seen from these variations from FIGS. 6 to 9, in a case where the arc ratio lies in a range of values smaller than $3\alpha$ (i.e., $\theta a < 3\alpha$), there is a relatively large contribution ratio of distortion factor from 11-th and 13-th order harmonic components. In a case where the arc ratio lies in a range of values equal to or larger than $3\alpha$ (i.e., $\theta a < 3\alpha$), there is a small contribution ratio of distortion factor from 13-th order harmonic component and a slightly large contribution ratio of distortion factor from 5-th and 7-th order harmonic components. In a case where the arc ratio lies in a range of values equal to or larger than $3.8\alpha$ (i.e., $\theta a \geq 3.8\alpha$) which is in the vicinity of the peak value of 5-th order harmonic component, there is a slightly large contribution ratio of distortion factor from 7-th order harmonic component.

Figure 10:
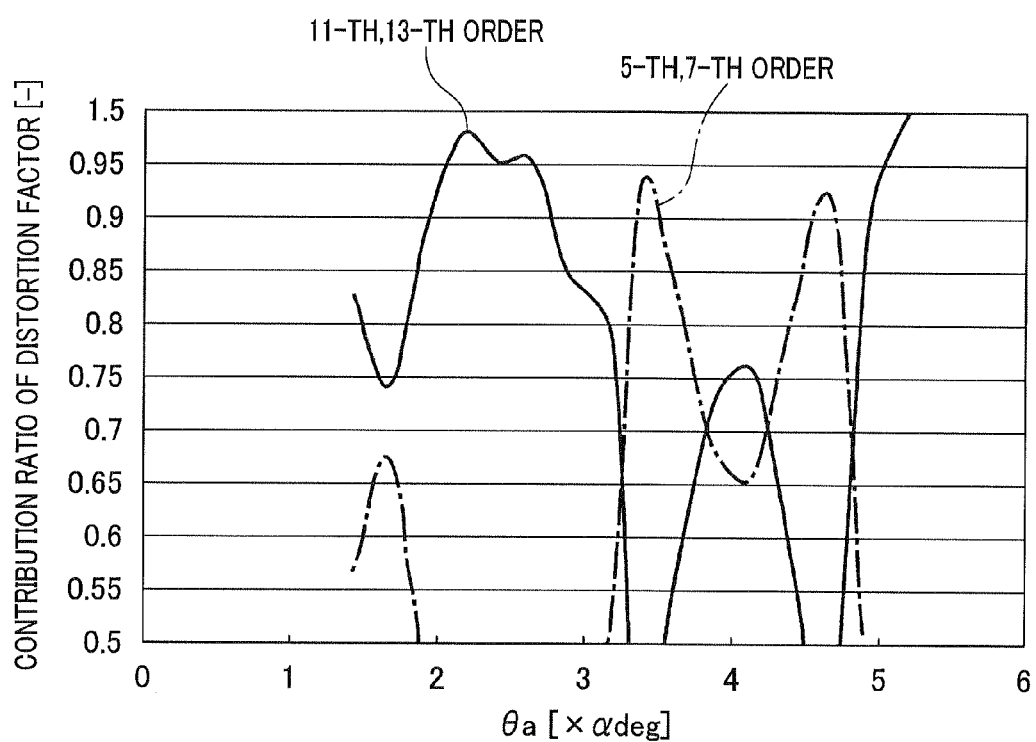
FIG. 10 is a graph showing a variation of contribution ratio of distortion factor relative to arc ratio in the rotary electric machine shown in FIG. 1.

FIG. 10 shows variations of each harmonic component, in which the horizontal axis represents arc ratio ($\theta a$) and the vertical axis represents contribution ratio of distortion factor. Here, the contribution ratio of distortion factor means a total harmonic distortion (THD) (expressed by the formula (1) as described above) relative to distortion factor of harmonic component, which is expressed by:

Contribution Ratio of Distortion Factor=Distortion Factor/THD

As can be seen from FIG. 10, in a case where the arc ratio lies in a range from $1.9\alpha$ to $3.2\alpha$ (i.e., $\theta a = 1.9\alpha$ to $3.2\alpha$), it is possible to effectively remove distortion components (i.e., harmonic components) from the fundamental wave, if 11-th and 13-th order harmonic components are cancelled. In a case where the arc ratio lies in a range of values of $3.3\alpha$ to $3.5\alpha$ and in a range from $4.4\alpha$ to $4.7\alpha$ (i.e., $\theta a = 3.3\alpha$ to $3.5\alpha$ and $\theta a = 4.4\alpha$ to $4.7\alpha$), it is possible to effectively remove distortion components from the fundamental wave, if 5-th and 7-th order harmonic components are cancelled.

Figure 11:
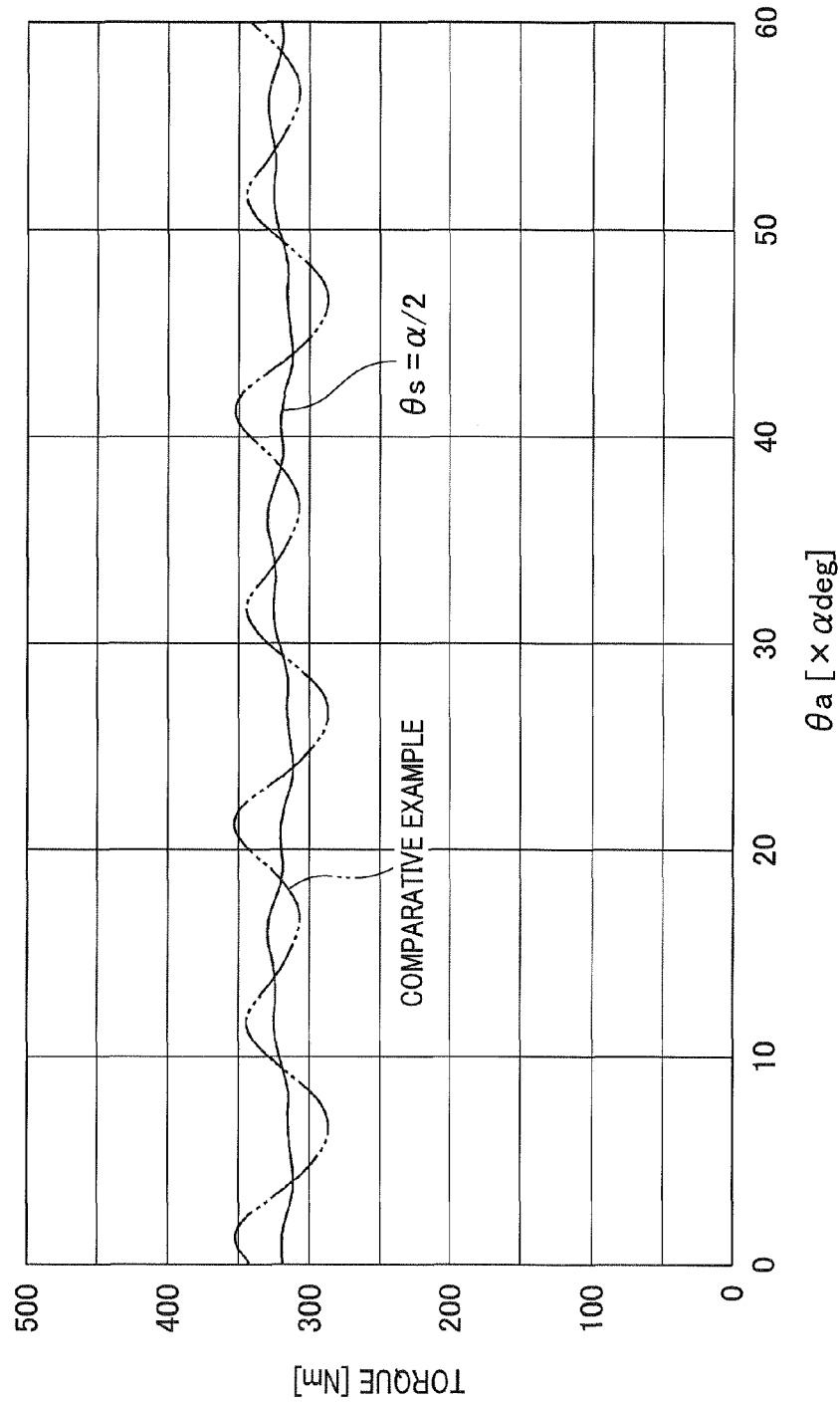
FIG. 11 is a graph showing a variation of torque relative to arc ratio in 13-th harmonic component in the rotary electric machine shown in FIG. 1.

FIG. 11 shows a variation of a torque represented by the vertical axis relative to an arc ratio ($\theta a$) represented by the horizontal axis. In FIG. 10, a variation in a case where the skew angle in the rotary electric machine 10 is set to $\alpha/2$ (i.e., $\theta s = \alpha/2$) (i.e., determined by the formula (3) as described above) is represented by solid line, and a variation of a comparative example in related art is represented by the chain double-dashed line. As can be seen from the variation of the rotary electric machine 10 (at $\theta s = \alpha/2$), its variation of torque is less than the comparative example, even when the arc ratio varies.

As can be seen from the characteristics in FIGS. 4 to 11 (particularly, FIGS. 4 and 10), it is preferable that, in order to keep harmonic components low and to reduce noise vibration, the rotary electric machine 10 is set as follows:

First Configuration Example

In a case where the magnet section 14 is configured in such a manner that the arc ratio lies in a range of values from $2.2\alpha$ to $3.3\alpha$ (i.e, $2.2\alpha \leq \theta a \leq 3.2\alpha$), the skew angle is set to $\alpha/2$ (i.e., $\theta s = \alpha/2$). This configuration example satisfies the formula (2) at k=1, i.e, the formula (3).

Second Configuration Example

In a case where the magnet section 14 is configured in such a manner that the arc ratio is $\theta \alpha = 1.65\alpha$ or $\theta a = 1.75S\alpha \leq \theta a \leq 2.35S\alpha$ if the slot factor is 2 (i.e., S=2), the skew angle is set to $S\alpha/2$ (i.e., $\theta s = S\alpha/2$). In this embodiment, the slot factor is set to a value of 2 (i.e., S=2), and then, the arc ratio lies in a range of $\theta a = 2.2S$ to $2.3S$. Here, if the slot factor is set to a value 3 (i.e., S=3), then the arc ratio lies in a range of $\theta a = 1.46S$ to $1.53S$. This configuration example satisfies the formula (2) at k=S, i.e, the formula (4).

According to the above-described first exemplary embodiment, the following effects can be obtained.

(a) The rotary electric machine 10 is configured by setting the skew angle so as to satisfy:

$\theta s = k\alpha/2$ where: (i) S is a slot factor which is a ratio of the slots 12s relative to the magnet section 14 (the magnets M1, M2, M3 and M4); (ii) $\alpha$ (deg) is a slot pitch which is an angle between the slots 12s; (iii) $\theta a$ is an arc ratio which is an angle covering an area in which magnetic flux radially flows from the magnetic section 14; and (iv) $\theta s$ is a skew angle which is an angle determined by a positional difference between the magnets M1, M2, M3 and M4 included in the magnet section 14.

According to this configuration, it is experimentally ascertained that the harmonic components (particularly, 5-th order harmonic component) can be reduced. This allows THD in the formula (1) to be low, thereby being able to reduce noise vibration compared to related art. Due to low THD, circuit elements such as IGBTs (insulated gate bipolar transistors)

and FETs (field effect transistors) used in inverters, motor drivers, or the like can be configured by those that have low pressure resistance and are available at relatively low cost. As a result, cost reduction can be achieved.

(b) The magnet section 14 is configured by setting the skew angle θs using k=S in a case where the arc ratio lies in a range of values from 2.2Sα to 2.4Sα (i.e., 2.2Sα≤θa≤2.4Sα) (see FIGS. 4 to 11). In other words, the skew angle is determined so as to satisfy the formula (4) as described above. According to this configuration, there is a relatively small influence from 11-th, 13-th, or the like order harmonic components, and 5-th, 7-th, or the like order harmonic components can be effectively cancelled. Thus, THD can be kept low, and noise vibration can be reduced compared to related art. These effects can be obtained without the need for an additional circuit element such as a capacitor, and then, cost reduction can be achieved.

(c) The magnet section 14 is configured by setting the skew angle θs using k=1 in a case where the arc ratio lies in a range of values from 2.2Sα to 2.4Sα (i.e., 2.2Sα≤θa≤2.4Sα) (see FIGS. 4 to 11). In other words, the skew angle is determined so as to satisfy the formula (3) as described above. According to this configuration, there is a relatively small influence from 5-th, 7-th, or the like order harmonic components, and 11-th, 13-th, or the like order harmonic components can be effectively cancelled. Thus, THD can be kept low, and noise vibration can be reduced compared to related art. These effects can be obtained without the need for an additional circuit element such as a capacitor, and then, cost reduction can be achieved.

(d) The magnet section 14 is configured by even number of magnets (four magnets M1, M2, M3 and M4 in this embodiment). These magnets M1, M2, M3 and M4 have boundaries B1, B2 of magnetic poles at positions other than the central line CL (center) (see FIG. 3). According to this, there is only need to shift the boundaries B1, B2 of magnetic poles to positions other than the central line CL. This can simplify the configuration and production process.

Modifications

Next, modifications of the first exemplary embodiment are described with reference to FIGS. 12 to 18. In the above-described embodiment, the magnet portions 14a and 14b of the magnet section 14 are located so as to be inclined at the inclination angle Y(θ) to be mirror images of each other (see FIG. 2). Further, the magnets M1, M2, M3 and M4 are configured to be laminated in the axial direction in such a way that the boundaries B1 and B2 are positioned symmetrically to each other with respect to the center line CL (see FIG. 3). As an alternative to or in addition to this configuration, if the arc ratio is θa, the magnet portions of the magnet section 14 may be arbitrarily configured. Hereinafter, a "magnet width" means a circumferential width of each magnet portion.

Figure 12:
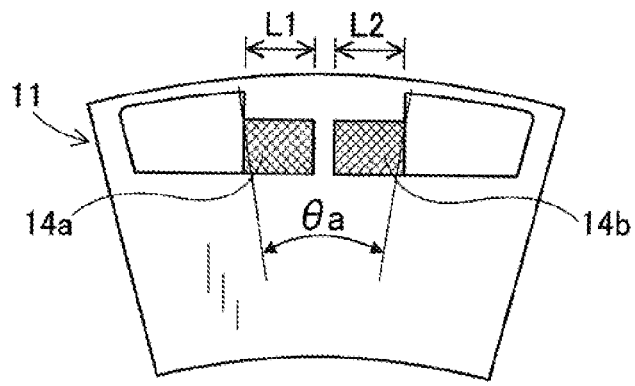
FIG. 12 is a schematic diagram showing a first arrangement of the magnet section in the rotor shown in FIG. 1.
Figure 13:
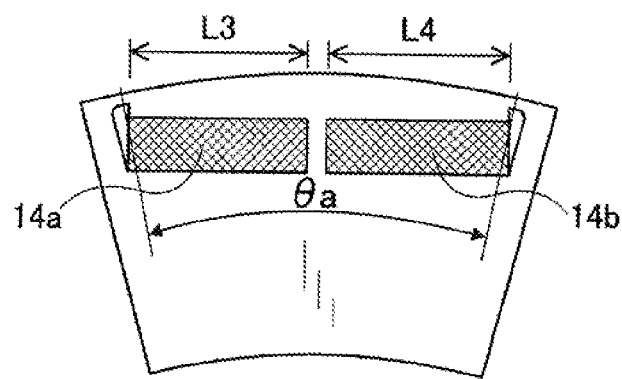
FIG. 13 is a schematic diagram showing a second arrangement of the magnet section in the rotor shown in FIG. 1.
Figure 14:
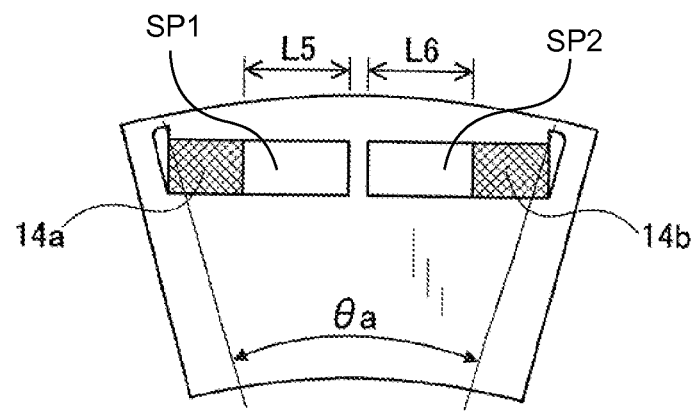
FIG. 14 is a schematic diagram showing a third arrangement of the magnet section in the rotor shown in FIG. 1.

For example, as shown in FIG. 12, the magnet portion 14a may have a magnet width L1 and the magnet portion 14b may have a magnet width L2. In Fig. these magnet widths L1 and L2 may be set to L1=L2 or L1≠L2. Alternatively, as shown in FIG. 13, the magnet portion 14a may have a magnet width L3 (which is set to L3>L1) and the magnet portion 14b may have a magnet width L4 (which is set to L4>L2). In FIG. 13, these magnet widths L3 and L4 may be set to L3=L4 or L3≠L4. FIGS. 13 and 14 show examples of the inclination angle of Y(θ)=0. As an alternative, any one or both of the magnet portions 14a and 14b may be inclined at predetermined angle Y(θ).

FIG. 14 shows a modification of FIG. 12. FIG. 14 differs from FIG. 12 in the following: in FIG. 12, the iron core (i.e., rotor core) of the rotor 11 lies between the magnet portions 14a and 14b; and in FIG. 14, space portions SP1 and SP2, in which magnetic flux is hard to flow, are formed in the iron core of the rotor 11 in such a way as to lie the magnet portions 14a and 14b. If the space portion SP1 on the side of the magnet portion 14a has a circumferential width L5 and the space portion SP2 on the side of the magnet portion 14b has a circumferential width L6, then these widths L5 and L6 may be set to L5=L6 or L5≠L6.

Next, characteristics of the rotary electric machine 10 with the magnet section 14 configured as shown in FIGS. 12 to 14 are described with reference to FIGS. 15 to 18.

Figure 15:
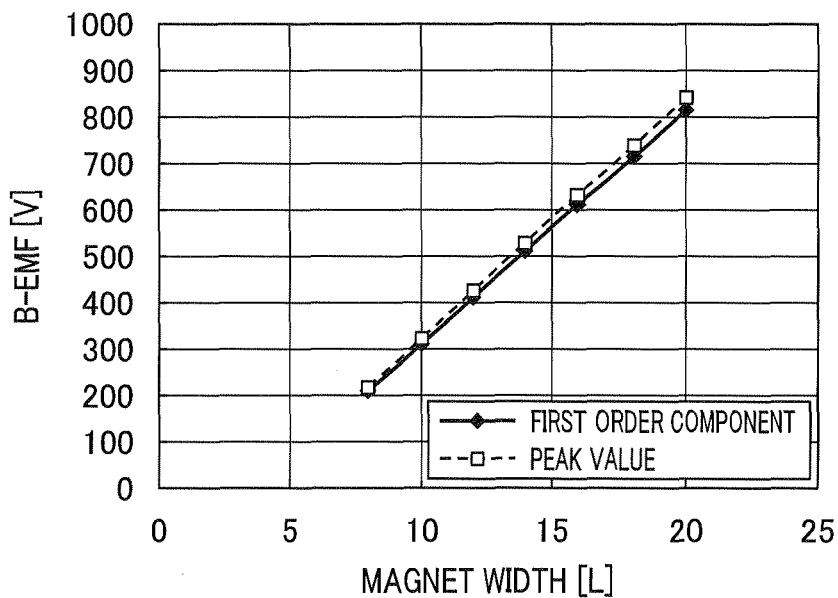
FIG. 15 is a graph showing a variation of back electromotive force relative to magnet width in the rotary electric machine shown in FIG. 1.

FIG. 15 shows a variation of a back electromotive force (B-EMF) represented by the vertical axis relative to a magnet width of the magnet portion represented by the horizontal axis. As can be seen from the variation shown in FIG. 15, when the magnet width varies, a peak value of the harmonic component varies with the fundamental wave (first order component) in almost the same way.

Figure 16:
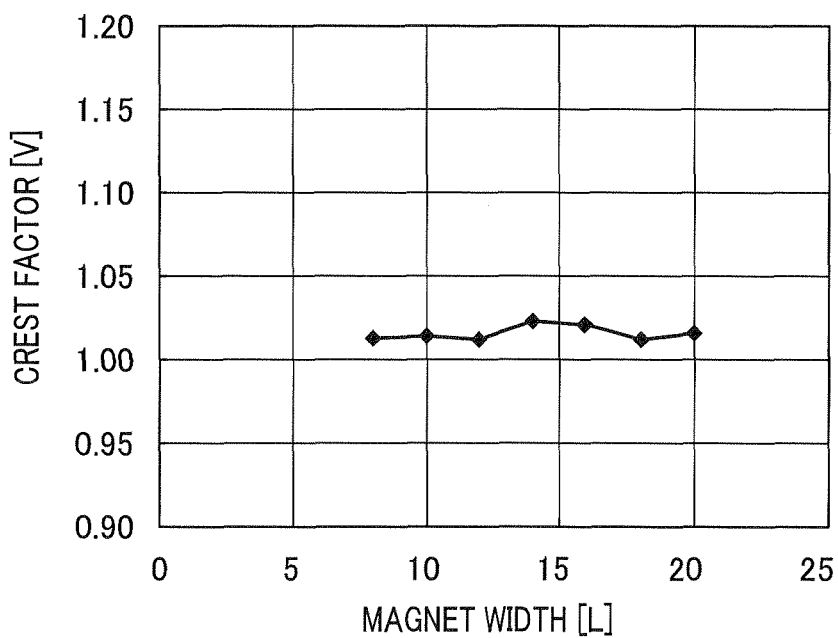
FIG. 16 is a graph showing a variation of crest factor relative to magnet width in the rotary electric machine shown in FIG. 1.

FIG. 16 shows a variation of a crest factor represented by the vertical axis relative to a magnet width of the magnet portion represented by the horizontal axis. As can be seen from the variation shown in FIG. 16, even when the magnet width varies, the crest factor is mostly unchanged.

Figure 17:
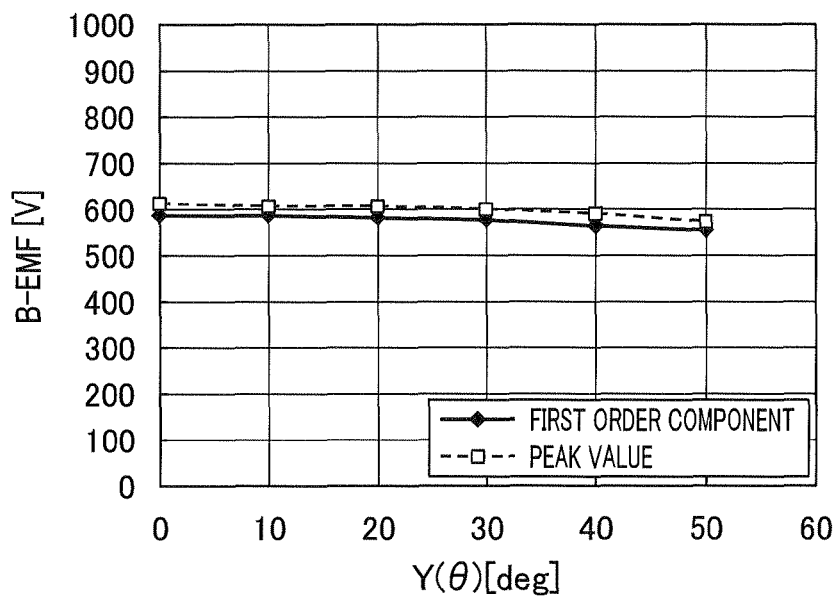
FIG. 17 is a graph showing a variation of back electromotive force relative to inclination angle of the magnet section in the rotary electric machine shown in FIG. 1.

FIG. 17 shows a variation of a back electromotive force (B-EMF) represented by the vertical axis relative to an inclination angle Y(θ) of the magnet portion represented by the horizontal axis. As can be seen from the variation shown in FIG. 17, even when the angle Y(θ) of the magnet portion varies, a peak value of harmonic component relative to the first order component (fundamental wave) is mostly unchanged.

Figure 18:
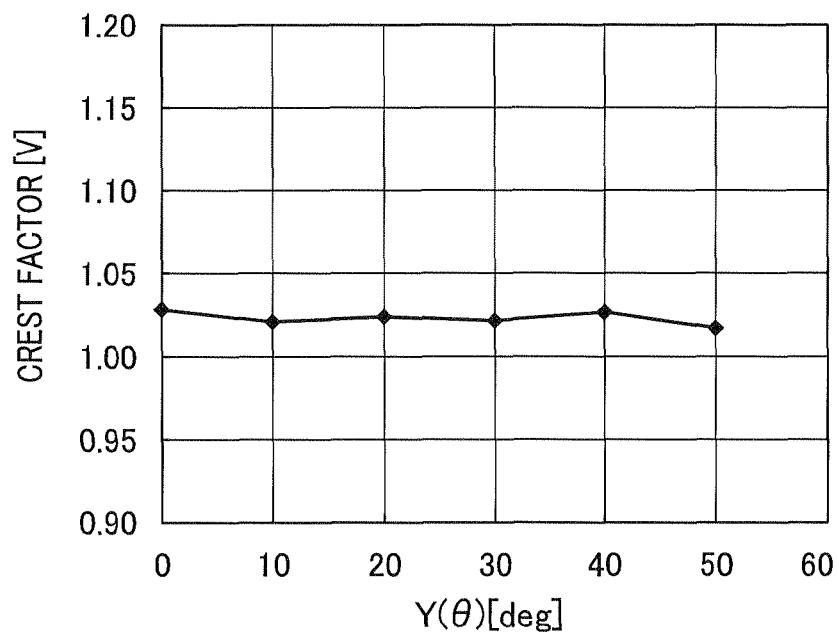
FIG. 18 is a graph showing a variation of crest factor relative to inclination angle of a magnet section in the rotary electric machine shown in FIG. 1.

FIG. 18 shows a variation of a crest factor represented by the vertical axis relative to an inclination angle Y(θ) of the magnet portion represented by the horizontal axis. As can be seen from the variation shown in FIG. 18, even when the angle Y(θ) of the magnet portion varies, the crest factor is mostly unchanged.

According to characteristics shown in FIGS. 15 to 18, it is clear that, with the same arc ratio θa, the magnet portions of the magnet section 14 may be variously configured. Therefore, the modification can have the same working effects as the above-described first exemplary embodiment.

Second Exemplary Embodiment

Figure 19:
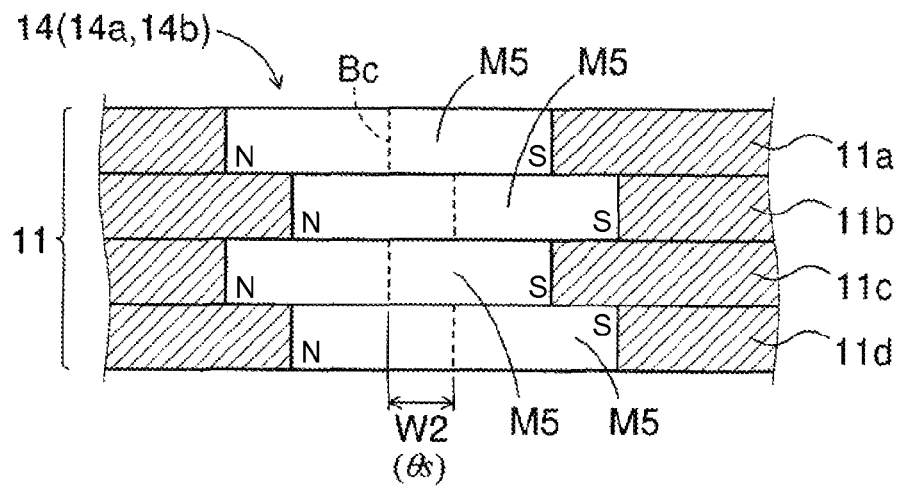
FIG. 19 is a schematic diagram showing a second configuration of a magnet section in the rotor shown in FIG. 1.
Figure 20:
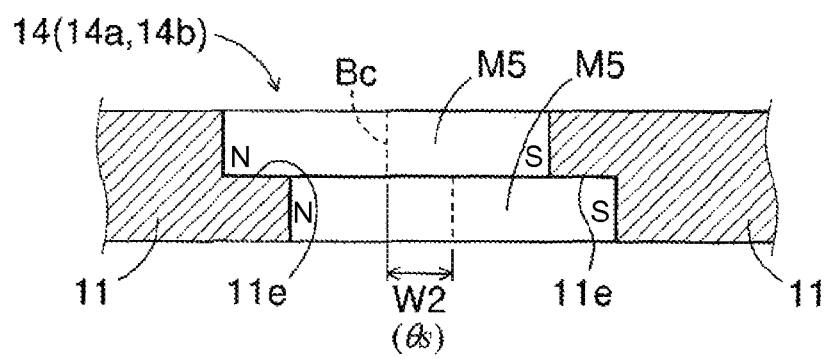
FIG. 20 is a schematic diagram showing a third configuration of a magnet section in the rotor shown in FIG. 1.

A second exemplary embodiment is described with reference to FIGS. 19 and 20. In FIGS. 19 and 20, hatchings for magnets are omitted, in order to make boundaries of magnetic poles easy to understand. The configuration or the like of the rotary electric machine 10 of this embodiment is the same as that of the first exemplary embodiment. For ease of drawings and explanations, only differences between this embodiment and the first exemplary embodiment are described below. Compared to the first exemplary embodiment, the same elements are given the same reference letters or numerals, and then, their detailed explanations are omitted.

In the first exemplary embodiment, the magnet section 14 is configured by laminating the magnets M1, M2, M3 and M4 in the axial direction in such a way that the boundaries B1 and B2 are positioned symmetrically to each other with respect to the center line CL (see FIG. 3). In other words, the magnet section 14 is configured by only first magnets. In this embodiment, the magnet section 14 is configured by only second magnets, each having a boundary of magnetic poles at a center position.

FIG. 19 shows a magnet section 14 having four magnets M5. Each magnet M5 has a boundary Bc of magnetic poles at each central line, and is separately embedded in a plurality of partial cores 11a, 11b, 11c and 11d. A pair of the partial cores 11a, 11c and a pair of the partial cores 11b, 11d are circumferentially shifted with respect to each other by a skew angle of θs (corresponding to a width W2 shown in FIG. 19). In such a circumferentially shifted state, four magnets M5 are axially laminated. In this way, the rotor 11 is configured by the partial cores 11a, 11b, 11c and 11d in which the magnets M5 are separately embedded.

In the configuration of FIG. 19, four partial cores 11a, 11b, 11c and 11d are used, but the number of axially laminated partial cores and their thickness are arbitrary, which are properly set depending on, for example, the purpose of use of the rotary electric machine 10 and a necessary torque. The number of partial cores may be, for example, 6, and their thickness may be, for example, 10 to 30 [mm].

FIG. 20 shows a magnet section 14 having two magnets M5. Each magnet M5 has a boundary Bc of magnetic poles at each central line, and is separately embedded in the rotor 11 via a through hole formed in the iron core (rotor core). In the periphery of the through hole, a stepped section 11e is formed into a stepped shape having a drop (height) corresponding to a thickness of the magnet M5. This stepped section 11e is configured in such a way that the two magnets M5 are alternately located. Thus, the boundary Bc of one of the two magnets M5 is shifted with respect to the boundary Bc of the other of the two magnets M5 by a skew angle of θs (corresponding to a width W2 shown in FIG. 20). The rotor 11 shown in FIG. 20 can be regarded as "partial core" (see the partial cores 11a, 11b, 11c and 11d). In this case, one rotor 11 may be configured by axially laminating two or more partial cores. There is no need to circumferentially shift the partial cores as shown in FIG. 19.

According to the above-described second exemplary embodiment, the following effects can be obtained. Since the elements other than the magnet section 14 are the same as that of the first exemplary embodiment, the above-described effects (a), (b) and (c) can be also obtained.

(e) The magnet section 14 is configured by a plurality of magnets M5 (second magnet), each having a boundary of magnetic poles at each central line (center) (see FIGS. 19 and 20). The number of magnets M5 may be two or more. According to this configuration, since general magnets can be used for magnets M5, the rotor 11 can be easily produced.

Third Exemplary Embodiment

Figure 21:
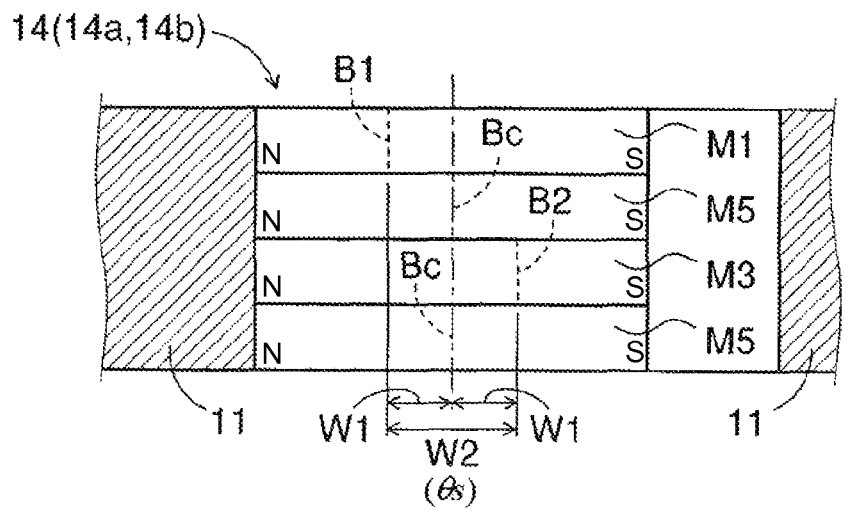
FIG. 21 is a schematic diagram showing a fourth configuration of a magnet section in the rotor shown in FIG. 1.

A third exemplary embodiment is described with reference to FIG. 21. In FIG. 21, hatchings for magnets are omitted, in order to make boundaries of magnetic poles easy to understand. The configuration or the like of the rotary electric machine 10 of this embodiment is the same as that of the first and second exemplary embodiments. For ease of drawings and explanations, only differences between this embodiment and the first and second exemplary embodiments are described below. Compared to the first and second exemplary embodiments, the same elements are given the same reference letters or numerals, and then, their detailed explanations are omitted.

In this embodiment, a magnet section 14 is configured by a combination of magnets M1, M3 (first magnet) used in the first exemplary embodiment and magnets M5 (second magnet) used in the first exemplary embodiment. This magnet section 14 includes four magnets, i.e., two magnets M1 (having a boundary B1 of magnetic poles), M3 (having a boundary B2 of magnetic poles) and two magnets M5 (having a boundary Bc of magnetic poles). As shown in FIG. 21, these magnets may be axially laminated in the order of: (i) magnets of M1, M5, M3 and M5; or (ii) magnets of M3, M5, M1 and M5. When viewed from an overall of the rotor 11, these magnets are located in such a manner that their boundaries B1, B2 and Bc are positioned symmetrically to one another with respect to a center line. The number of the first magnet (i.e., magnets M1, M2) and the number of the second magnet (i.e., magnets M5). are equal to each other.

According to the above-described third exemplary embodiment, the following effects can be obtained. Since the elements other than the magnet section 14 are the same as those of the first and second exemplary embodiments, the above-described effects (a), (b), (c) and (e) can be also obtained.

(f) In the magnet section 14, the number of the first magnets (i.e., magnets M1, M2) and the number of the second magnets (i.e., magnets M5). are equal to each other. According to this configuration, since it is only necessary to match the number of the first magnets with that of the second magnets, the magnet section 14 can be easily produced.

Modifications

The above has described the present invention with reference to the first to third exemplary embodiments. However, the present invention is not limited to the above exemplary embodiments. Various modifications apparent to those skilled in the art may be made on the configuration and details of the present invention within the scope of the present invention. For example, the following modifications may be realized.

In the above-described first to third exemplary embodiments, the slot factor S of the rotary electric machine 10 is set to a value of 2 (see FIG. 2). i.e., S=2 in the formula (4). As an alternative to this, the slot factor S may be set to a value other than 2.

Figure 22:
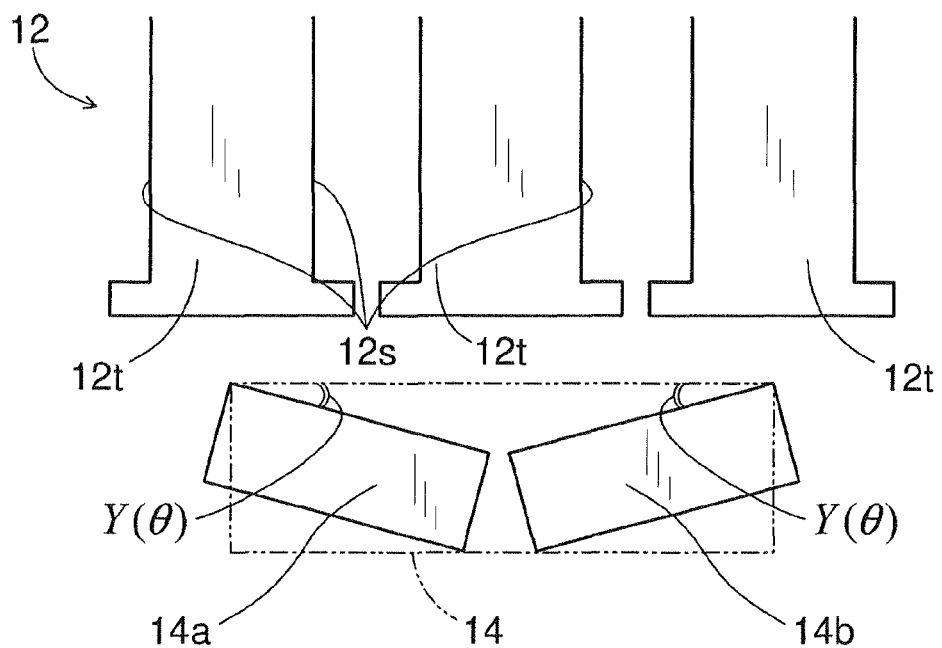
FIG. 22 is a second schematic diagram explaining slot factor in the rotary electric machine shown in FIG. 1.
Figure 23:
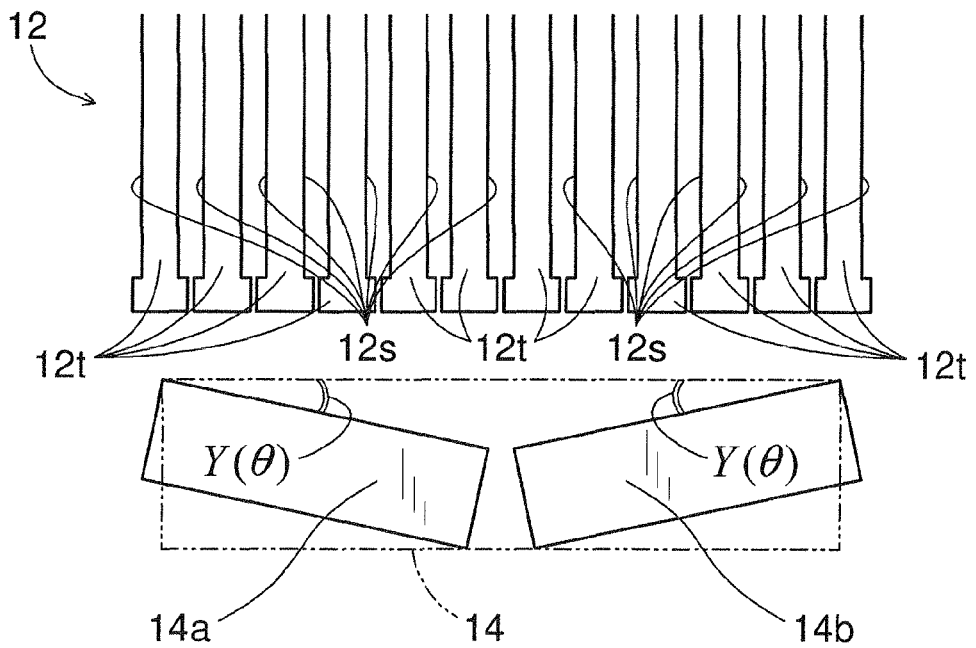
FIG. 23 is a third schematic diagram explaining slot factor in the rotary electric machine shown in FIG. 1.

For example, FIG. 22 shows an example of the slot factor which is set to a value of 1 (i.e., S=1 in the formula (4)), and FIG. 23 shows an example of the slot factor which is set to a value of 4 (i.e., S=4 in the formula (4)). In the rotary electric machine 10 with the slot factor set to a value of 1, for example, the number of pole pairs may be set to a value of 4 and the number of slots may be set to a value of 24. In the rotary electric machine 10 with the slot factor set to a value of 3, for example, the number of pole pairs may be set to a value of 4 and the number of slots may be set to a value of 72. As not shown in the drawings, the rotary electric machine 10 may be configured with the slot factor which is set to a value of 5 or more.

In FIGS. 22 and 23, the shaft center P of the rotor 11 and diagrammatic representation relating to the arc ratio θa are omitted. In any configuration of the rotary electric machine 10 using different slot factors, even though there is a difference in the value of the slot factor, the same effects as those of the first to third exemplary embodiments can be obtained.

In the above-described first to third exemplary embodiments, one magnet (each of the magnets M1 to M5) is configured to have north and south poles which are integrally formed via each boundary B1, B2, Bc (see FIGS. 3, 19 to 21). As an alternative to this, one magnet (magnetic pole) may be configured to be used for a north pole or a south pole.

Figure 24:
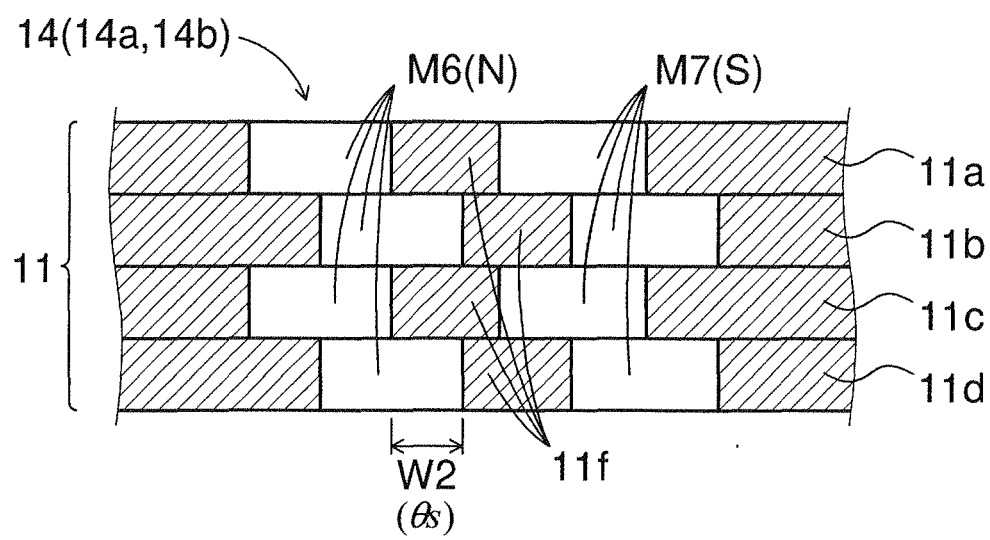
FIG. 24 is a schematic diagram showing a fifth configuration of a magnet section in the rotor shown in FIG. 1.

FIG. 24 shows an example of a magnet section 14 embedded in the plurality of partial cores 11a, 11b, 11c and 11d of the rotor 11 shown in FIG. 19. In FIG. 24, the magnet section 14 is provided a magnet M6 for a north pole and a magnet M7 for a south pole which pair with each other. In the magnet section 14, a partition wall 1 if (division wall or bulkhead) (a part of the partial cores 11a, 11b, 11c and 11d which are made of magnetic material) lies between the magnets M6 and M7. In other words, a pair of the magnets M6 and M7 corresponds to one magnet (among magnets M1 to M5).

Figure 25:
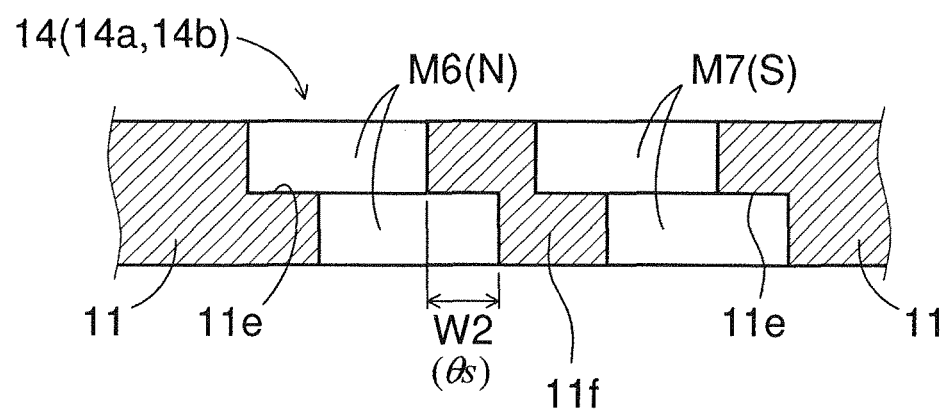
FIG. 25 is a schematic diagram showing a sixth configuration of a magnet section in the rotor shown in FIG. 1.
Figure 26:
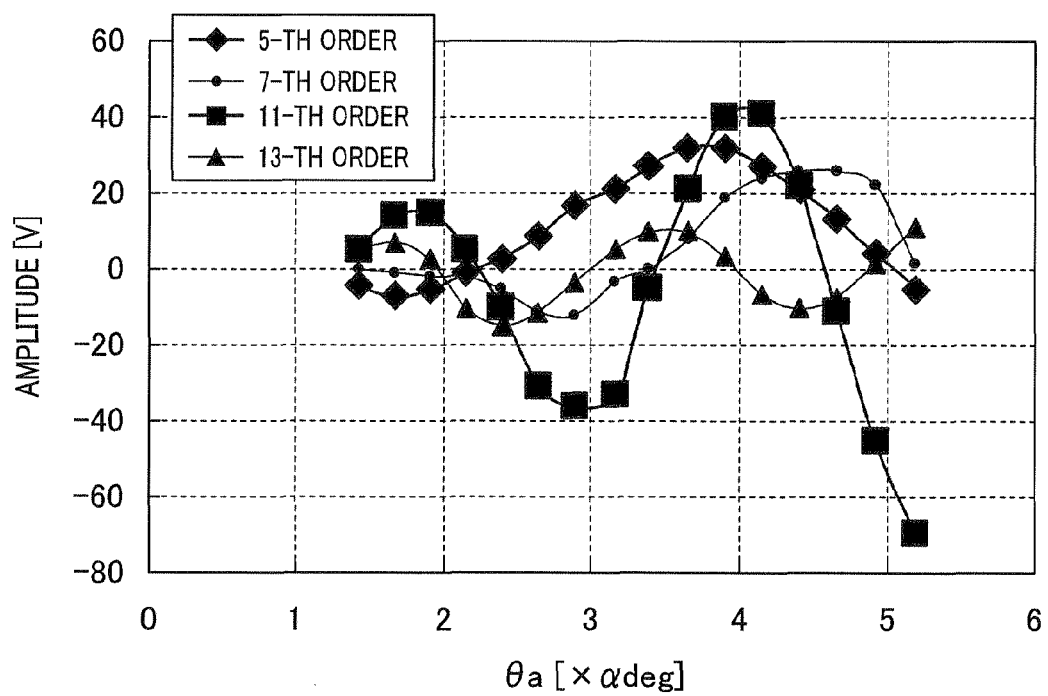
FIG. 26 is a graph showing a variation of amplitude relative to arc ratio in a rotary electric machine in related art.

FIG. 25 shows an example of a magnet section 14 embedded in rotor 11 with the stepped portion 11e. In the magnet section 14 shown in FIG. 25, a partition wall 11f is formed into an approximately Z-shaped form (or stepped form in cross-section).

As another example, a magnet section 14 may be configured by a single body, if magnetic flux (magnetic force) corresponding to a plurality of magnets (for example, a plurality of magnets M1 to M4, a plurality of magnets M5, a plurality of magnets M6, M7) can be secured and a boundary of magnetic poles can be shifted by a partial skew.

In any configuration as described above, amplitude of magnetic flux, even though there is a difference whether north and south poles are formed in one body or two separate bodies, magnetic flow, or the like are almost unchanged. Therefore, the same effects as those of the first to third exemplary embodiments can be obtained.

In the above-described first to third exemplary embodiments, the rotary electric machine is configured by an inner rotor type in which the rotor 11 is positioned at the inner diameter side from the stator 12 (see FIG. 1). As an alternative to this, the rotary electric machine may be configured by an outer rotor type in which the stator 12 is positioned at the inner diameter side from the rotor 11. In any configuration, magnetic flux flows between the rotor 11 and the stator 12, even though there is a difference of a positional relationship between the rotor 11 and the stator 12. Therefore, the same effects as those of the first to third exemplary embodiments can be obtained.

In the above-described first to third exemplary embodiments, the stator winding 13 is wound under the condition that the number of phases of the rotary electric machine 10 is set to three (i.e., U-, V- and W phases). As an alternative to this, the number of phases of the rotary electric machine 10 may be set to different number, for example, 2, 4, 6, 12, or the like. In any configuration, even though there is a difference of the number of phases, the same effects as those of the first to third exemplary embodiments can be obtained.

In the above-described first to third exemplary embodiments, the stator winding 13 is wound by using the short pitch winding in which three-phase windings are wound in such a way as to cross three slots 12s in the stator 12 by a ratio of 1:2:1. As an alternative to this, the number of crossed slots and its ratio may be set to different numbers. Further, the stator winding 13 may be wound by different winding methods, for example, a concentrated winding (also called "ordinary winding") in which three-phase windings are wound in such a way as to be concentrated at each one or more slots. In any configuration, even though there is a difference of the winding method, the same effects as those of the first to third exemplary embodiments can be obtained.

In the above-described first to third exemplary embodiments, each of the magnets (corresponding to magnets M1 to M7) for the magnet section 14 is formed into a rectangular prism shape (see FIGS. 1, 3 and 19 to 21). As an alternative to this, each magnet may be formed into different three-dimensional shapes, for example, a cubic shape, a columnar shape, a pyramid shape (including a frustum shape), or the like. In any configuration, even though there is a difference of the three-dimensional shape, the same effects as those of the first to third exemplary embodiments can be obtained.

What is claimed is:

1. A rotary electric machine, comprising:
a stator including a multi-phase stator winding that is held in a plurality of slots formed in the stator; and
a rotor located in a rotatable manner relative to the stator via a gap, the rotor including an iron core and at least one magnet section embedded in the iron core so as to face the slots, wherein:
the magnet section includes a plurality of axially laminated magnets; and
when: a slot factor is expressed by S which is a ratio of the slots relative to the magnet section; a slot pitch is expressed by α (deg) which is an angle between the slots, an arc ratio is expressed by θa (deg) which is a relative angle between two line segments of which: i) one connects one of two circumferential end points on a radial end side in a plurality of magnet portions included in the magnet section and a shaft center of the rotor and the stator; and ii) the other connects the other of the two circumferential end points and the shaft center, and a skew angle is expressed by θs (deg) which is an angle of a positional difference between the magnets, the skew angle is set so as to satisfy the following expressions:
θs=kα/2 where k is a coefficient; and
k=S where θa lies in range of 2.2Sα≤θa≤2.4Sα.

2. The rotary electric machine according to claim 1, wherein:
the magnet section includes, as the plurality of magnets, an even number of magnets including a first magnet having a boundary of magnetic poles that is located at a position other than its central position.

3. The rotary electric machine according to claim 1, wherein:
the magnet section includes, as the plurality of magnets, a second magnet having a boundary of magnetic poles that is located at its central position.

4. The rotary electric machine according to claim 3, wherein:
the rotor includes a plurality of axially laminated partial cores;
the second magnet is embedded in each of the partial cores in such a manner that the second magnet is circumferentially skewed by the skew angle.

5. The rotary electric machine according to claim 3, wherein:
in the rotor, a through hole is formed;
in the periphery of the through hole, a stepped section is formed into a stepped shape having a drop corresponding to a thickness of the second magnet;
the second magnet includes at least two axially laminated magnets which are embedded in the through hole in such a manner that the two magnets are circumferentially shifted with respect to each other by the skew angle via the stepped section.

6. The rotary electric machine according to claim 1, wherein:
the magnet section includes; as the plurality of magnets,
a first magnet having a boundary of magnetic poles that is located at a position other than its central position; and
a second magnet having a boundary of magnetic poles that is located at its central position,
the number of the first magnet and the number of the second magnet being equal to each other.

7. The rotary electric machine according to claim 6, wherein:
the rotor includes a plurality of axially laminated partial cores;
the first magnet and the second magnet are embedded in each of the partial cores in such a manner that the first magnet and the second magnet are axially laminated so as to be symmetrical with the central line.

8. The rotary electric machine according to claim 1, wherein:
each of the magnets is configured to have north and south poles which are integrally formed via each boundary of magnetic poles.

9. The rotary electric machine according to claim 1, wherein:
each of the magnets is configured by a magnet which is used for a north pole or a south pole.

10. The rotary electric machine according to claim 1, wherein:
the rotor is positioned at the inner diameter side from the stator.

11. The rotary electric machine according to claim 1, wherein:
the stator is positioned at the inner diameter side from the rotor.

12. The rotary electric machine according to any one of claim 1, wherein:
the rotary electric machine is mounted in a vehicle.

13. A rotary electric machine comprising:
a stator including a multi-phase stator winding that is held in a plurality of slots formed in the stator; and
a rotor located in a rotatable manner relative to the stator via a gap, the rotor including an iron core and at least one magnet section embedded in the iron core so as to face the slots, wherein:
the magnet section includes a plurality of axially laminated magnets; and
when: a slot factor is expressed by S which is a ratio of the slots relative to the magnet section; a slot pitch is expressed by $\alpha$ (deg) which is an angle between the slots, an arc ratio is expressed by $\theta a$ (deg) which is a relative angle between two line segments of which: i) one connects one of two circumferential end points on a radial end side in a plurality of magnet portions included in the magnet section and a shaft center of the rotor and the stator; and ii) the other connects the other of the two circumferential end points and the shaft center; and a skew angle is expressed by $\theta s$ (deg) which is an angle of a positional difference between the magnets, the skew angle is set so as to satisfy the following expressions:
$\theta s = k\alpha/2$ where k is a coefficient; and
$k=S=1$ where $\theta a$ lies in a range of $2.2\alpha \leq \theta a \leq 3.2\alpha$.

14. The rotary electric machine according to claim 13, wherein:
the magnet section includes, as the plurality of magnets, an even number of magnets including a first magnet having a boundary of magnetic poles that is located at a position other than its central position.

15. The rotary electric machine according to claim 13, wherein:
the magnet section includes, as the plurality of magnets, a second magnet having a boundary of magnetic poles that is located at its central position.

16. The rotary electric machine according to claim 13, wherein:
the magnet section includes; as the plurality of magnets,
a first magnet having a boundary of magnetic poles that is located at a position other than its central position; and
a second magnet having a boundary of magnetic poles that is located at its central position,
the number of the first magnet and the number of the second magnet being equal to each other.

* * * * *